United States Patent [19]

Matsuo et al.

[11] 4,271,066

[45] Jun. 2, 1981

[54] PROCESS FOR DISPROPORTIONATING ROSIN, POLY-UNSATURATED FATTY ACIDS AND MIXTURES THEREOF

[75] Inventors: Kohtaro Matsuo, Mino; Satoshi Kawamura, Takatsuki; Tatsumi Toshine, Yawata, all of Japan

[73] Assignee: Arakawa Kagaku Kogyo Kabushiki Kaisha, Japan

[21] Appl. No.: 91,490

[22] Filed: Nov. 5, 1979

[51] Int. Cl.³ .......................... C09F 1/04; C09F 7/08; B01J 27/02; B01J 27/08
[52] U.S. Cl. ................................. 260/97.5; 252/439; 252/441; 260/97; 260/106; 260/405.6; 260/404.8
[58] Field of Search ............ 260/97.5, 97, 106, 404.8, 260/405.6

[56] References Cited

U.S. PATENT DOCUMENTS

| | | | |
|---|---|---|---|
| 2,285,458 | 6/1942 | Pragoff | 260/106 |
| 2,503,268 | 4/1950 | Hasselstrom et al. | 260/106 |
| 2,617,792 | 11/1952 | Floyd | 260/97.5 |
| 2,692,886 | 10/1954 | Blekkingh | 260/405.6 |
| 2,746,979 | 5/1956 | von Mikusch-Buchberg | 260/405.6 |
| 3,872,073 | 3/1975 | Thorpe et al. | 260/97.5 |
| 3,943,118 | 3/1976 | Lehtinen | 260/405.6 |
| 3,980,630 | 11/1976 | Ishigami et al. | 260/97.5 |
| 4,126,604 | 11/1978 | Olford et al. | 260/97.5 |
| 4,133,822 | 1/1979 | Hasman | 260/97.5 |

*Primary Examiner*—H. S. Cockeram
*Attorney, Agent, or Firm*—Larson and Taylor

[57] ABSTRACT

This invention provides a process for disproportionating rosin, poly-unsaturated fatty acid or mixture thereof, characterized in that the disproportionation reaction is conducted in the presence of a catalyst comprising (A) at least one iodide selected from the group consisting of sodium iodide and potassium iodide and (B) at least one iron compound selected from the group consisting of iron, iron oxides, iron hydroxides and iron sulfides. The disproportionated product of this invention affords an emulsifier suitable for emulsion polymerization when neutralized with an alkali.

5 Claims, No Drawings

PROCESS FOR DISPROPORTIONATING ROSIN, POLY-UNSATURATED FATTY ACIDS AND MIXTURES THEREOF

This invention relates to a process for disproportionating rosin, poly-unsaturated fatty acids and mixtures thereof.

As is well known, rosin is a natural product consisting predominantly of abietic acid and like resin acids having a conjugated double bond and pimaric acid, isopimaric acid and like resin acids having a non-conjugated double bond. Rosin may be classified into three types, namely gum rosin, wood rosin and tall oil rosin, according to the method of extraction and production process. It is also known that the resin acid having a conjugated double bond and contained in rosin, especially abietic acid, interferes with free radical polymerization when rosin is used as an emulsifier for the production of styrene-butadiene rubber, ABS resin, chloroprene rubber and the like by emulsion polymerization. Accordingly soaps of so-called disproportionated rosin in which the conjugated double bond has been eliminated by a disproportionation reaction are industrially used widely for this application. Furthermore, linoleic acid, linolenic acid or like poly-unsaturated fatty acid, or a mixture of such acid and rosin, e.g. tall oil, is similarly subjected to a disproportionation reaction to obtain a product which is useful for preparing emulsifiers for emulsion polymerization.

For the disproportionation reaction, rosin is heated usually in the presence of a catalyst, such as palladium, nickel, sulfur, selenium, iodine, iron iodide or the like. However, palladium and nickel catalysts, which are prone to be poisoned with sulfur or sulfur compounds, are not suitable for the disproportionation of tall oil and tall oil rosin which contain several hundred ppm of sulfur. These catalysts have another drawback that even when used for the disproportionation of gum rosin or wood rosin once, they are not reusable.

Sulfur and selenium, although free of poisoning with sulfur or sulfur compounds, are not desirable since they give off a poisonous gas, such as hydrogen sulfide or hydrogen selenide, during the disproportionation reaction.

Iodine, which is prone to sublimation, involves sublimation losses, causes corrosion of the reactor and therefore poses limitations on the type of reactor which can be used. Additionally, iodine decomposes resin acids during reaction, affording a disproportionated rosin having a very low softening point, and gives the dark-colored disproportionation product.

Iron iodide gives a dark-colored disproportionated rosin and is likely to cause corrosion.

Accordingly, an object of the present invention is to provide a process for disproportionating rosin, poly-unsaturated fatty acids and mixtures thereof without entailing the foregoing drawbacks attendant on the use of the conventional catalysts.

Another object of the invention is to provide a process for disproportionating rosin, poly-unsaturated fatty acids and mixtures thereof with use of a catalyst which will not be poisoned with sulfur or sulfur compounds contained in the material to be disproportionated.

Another object of the invention is to provide a process for disproportionating rosin, poly-unsaturated fatty acids and mixtures thereof without entailing evolution of poisonous gas.

Another object of the invention is to provide a process for disproportionating rosin, poly-unsaturated fatty acids and mixtures thereof without using compounds which would involve corrosion of the reactor, sublimation and attendant problems.

Another object of the invention is to provide a process for disproportionating rosin, poly-unsaturated fatty acids and mixtures thereof with the coloration of the resulting products minimized.

Still another object of the invention is to provide a process for disproportionating rosin, poly-unsaturated fatty acids and mixtures thereof which will not give a product of greatly lowered softening point.

These objects and features of the invention will become apparent from the following description.

The present invention provides a process for disproportionating rosin, poly-unsaturated fatty acid or mixture thereof, the process being characterized in that the disproportionation reaction is conducted in the presence of a catalyst comprising (A) at least one iodide selected from the group consisting of sodium iodide and potassium iodide and (B) at least one iron compound selected from the group consisting of iron, iron oxides, iron hydroxides and iron sulfides.

We have conducted research in order to overcome the drawbacks of the catalysts heretofore used for the disproportionation of rosin. In the course of our research, we made investigations on the catalytic activity of sodium iodide and potassium iodide for disproportionation and found that these iodides have very low catalytic activity, failing to disproportionate rosin and permitting a large amount of abietic acid to remain in the reaction mixture. Furthermore, metallic iron and iron compounds such as iron oxide, hydroxide and sulfide were found to be totally inactive as a disproportionation catalyst. Surprisingly, however, we have further found that when the iodide (A) and the iron compound (B) are used in combination as a disproportionation catalyst, they completely disproportionate rosin without permitting any portion of abietic acid to remain in the reaction mixture. We have also found that the iodide (A) and the iron compound (B), when used conjointly, effectively disproportionate poly-unsaturated fatty acids such as linoleic acid and linolenic acid. Furthermore, a mixture of rosin and poly-unsaturated fatty acid, such as tall oil, can also be disproportionated similarly effectively by the conjoint use of these (A) and (B). This invention has been accomplished based on these novel findings.

The iodide (A) and the iron compound (B) to be used in combination for the present process are not poisoned with sulfur in any way, so that the process, unlike the conventional process in which a palladium or nickel catalyst is used, assures effective disproportionation of tall oil, or tall oil rosin, tall oil fatty acids and the like derived from tall oil. Moreover the iodide (A) and iron compound (B) are reusable on recovery. Unlike the conventional process in which an iodine catalyst is used, the process of the invention does not involve the problems attributable to the sublimation and corrosive properties of the catalyst. Whereas the use of sulfur or selenium leads to the evolution of poisonous gas, the reaction of the invention is free of this problem. Additionally the process of the invention gives a disproportionated product with minimized coloration. The process has another advantage that rosin can be disproportionated almost without permitting the decomposition of resin acids and, accordingly, without any likelihood of giving a disproportionated product of greatly lowered softening point. The present process, when applied to tall oil, causes transfer of hydrogen between abietic acid and poly-unsaturated fatty acids in tall oil, primarily forming dehydroabietic acid and mono-unsaturated fatty acids almost without permitting any abietic acid or poly-unsaturated fatty acids to remain in the resulting reaction mixture. The poly-unsaturated fatty acids, when disproportionated by the present process, give a mixture of mono-unsaturated fatty acids and dimers or trimers of the poly-unsaturated fatty acids, which mixture, when further distilled, afford mono-unsaturated fatty acids of high purity containing little or no poly-unsaturated fatty acids.

The materials which can be disproportionated by the process of this invention are rosin, poly-unsaturated fatty acids and mixtures thereof. Examples of rosin are gum rosin, wood rosin and tall oil rosin. Examples of poly-unsaturated fatty acids are linoleic acid, linolenic acid, and tall oil fatty acids, linseed oil fatty acids, cotton seed oil fatty acids, rape seed oil fatty acids, soybean oil fatty acids, etc. which contain large amounts of these acids. Examples of mixtures of rosin and poly-unsaturated fatty acids are tall oil, etc. Such mixtures may be any mixtures of rosin and poly-unsaturated fatty acids.

The iodides (A) to be used in this invention are sodium iodide and potassium iodide which may be conjointly usable. These iodides (A) are used in the form of particles (crystals) in which they are usually available. The iodide (A) is used usually in an amount of about 0.01 to about 5% by weight, preferably about 0.1 to about 2% by weight, based on the material to be disproportionated. With a decrease in the amount of the iodide below 0.01% by weight, the disproportionation efficiency tends to reduce, whereas amounts exceeding 5% by weight, although not objectionable, will not achieve any remarkable improvement in the result obtained. The iodide is usable as supported on a suitable carrier, such as carbon, alumina or the like, in the usual manner.

Examples of useful iron compounds (B) are metallic iron, and iron oxides, hydroxides and sulfides, at least two of which may be usable in combination. Examples of useful iron oxides are $Fe_2O_3$, $Fe_3O_4$, FeO, etc. Examples of useful iron hydroxides are $Fe(OH)_3$, $Fe(OH)_2$, etc. Examples of useful iron sulfides are FeS, $Fe_2S_3$, etc. The iron compounds (B) are advantageously usable in the form of particles or powder. They are smaller than 10 mesh, preferably smaller than 50 mesh, in particle size. (The term "mesh" as used herein refers to such a size that in the case of 10 mesh, for example, the size is 1/10 of an inch, and in the case of 50 mesh, the size is 1/50 of an inch.) The iron compound (B) is used usually in an amount of about 0.01 to about 5% by weight, preferably about 0.1 to about 1% by weight, based on the material to be disproportionated. With a decrease in the amount of the compound (B) below 0.01% by weight, there is a tendency for the disproportionation efficiency to decrease progressively, whereas amounts in excess of 5% by weight, although not particularly objectionable, will not produce a noticeably improved effect. The iron compound (B) is usable also as supported on a suitable carrier, such as carbon, alumina or the like, in the usual manner.

The process of this invention can be carried out in an open or closed container by a batchwise or continuous operation. The process is not particularly limited in the order in which the iodide (A) and the iron compound (B) are added to the material to be disproportionated, namely rosin, poly-unsaturated fatty acid or mixture thereof. For example, a mixture of iodide (A) and iron compound (B) may be added to the material to be disproportionated. Alternatively (A) and (B) may be added to the material individually. The reaction is performed with the catalyst uniformly dispersed in the material to be disproportionated. The reaction is conducted at an elevated temperature conventionally employed, usually at a temperature of a about 150° to about 300° C., preferably about 180° to about 280° C., for about 1 to about 8 hours. At temperatures below 150° C., the reaction will proceed generally at a very low velocity, whereas temperatures exceeding 300° C. cause decarboxylation, hence undesirable. Preferably the reaction is conducted in a nitrogen, carbon dioxide or like inert gas atmosphere. On completion of the reaction, the catalyst is removed by a usual method, for example, by filtration to obtain the disproportionated product.

The disproportionated product of this invention affords a soap suitable for emulsion polymerization, namely an emulsifier, when nutralized with an alkali, such as sodium hydroxide, potassium hydroxide or the like, in the usual manner.

The features of this invention will be described below with reference to examples and comparison examples, in which the percentages are all by weight. The resin acids and fatty acids are analyzed and the properties of the materials and products are determined by the following methods.

1. Determination of the compositions of resin acids and fatty acids

The total resin acid content and the total fatty acid content are determined according to ASTM D 1585-63. The amounts of the components contained in the resin acids and fatty acids are determined by converting the resin acid or fatty acid to a methyl ester with diazomethane and subjecting the ester to gas chromatography (with use of a 3-m long column packed with diethylene glycol succinate, namely DEGS, at a temperature of 200° C.). The contents of the components are expressed in percent by weight based on the overall weight of the material or the product.

2. Acid value

According to ASTM D 465-51.

3. Softening point

By the ring-and-ball method.

4. Color

A potassium salt of the disproportionated product is formulated into a 25% aqueous solution, and the color of the solution is expressed in terms of Gardner color number.

5. Iodine value

According to ASTM D 1959-61.

EXAMPLES 1 to 4

Into a four-necked flask are placed 200 g of tall oil rosin having the properties given below and a specified amount of catalyst, and the mixture is heated with stirring at 220° C. for 4 hours with nitrogen gas introduced into the flask. On completion of the reaction, the catalyst is filtered off while hot, and the reaction mixture is cooled.

Properties of tall oil rosin
  Acid value: 178.7
  Softening point: 67.0° C.
  Resin acids: 91.1% (containing 16.4% of dehydroabietic acid and 39.2% of abietic acid)

Fatty acids: 4.9%

Neutral substances: 4.0%

Table 1 shows the kinds and amounts (in percent by weight based on the tall oil rosin) of the catalysts used, and the properties and composition of the disproportionated product.

COMPARISON EXAMPLES 1 AND 2

Disproportionation reaction is conducted in the same manner as in Example 1 except that iodine (Comparison Example 1) or sodium iodide (Comparison Example 2) are used in the amount listed in Table 1.

Table 1 shows the kind and amount (in percent by weight based on the tall oil rosin) of the catalyst used, and the properties and composition of the disproportionated product.

from the catalyst and then cooled. Table 2 shows the properties and composition of the disproportionated product, and the kinds and amounts of the catalysts used. The tall oil treated has the following properties.

Acid value: 184.6

Resin acids: 54.7%

Abietic acid: 20.8%

Dehydroabietic acid: 9.5%

Fatty acids: 41.9%

Linoleic acid: 8.2%

Oleic acid: 16.3%

COMPARISON EXAMPLE 3

Disproportionation reaction is performed in the same manner as in Examples 5 to 8 except that potassium iodide is used.

TABLE 1

|  | Ex. 1 | Ex. 2 | Ex. 3 | Ex. 4 | Comp. Ex. 1 | Comp. Ex. 2 |
|---|---|---|---|---|---|---|
| Catalyst |  |  |  |  |  |  |
| Kind | NaI + Fe[1] | NaI + Fe$_2$O$_3$ | NaI + Fe(OH)$_3$ | NaI + FeS | I$_2$ | NaI |
| Amount (wt.%) | 0.5 + 0.3 | 0.6 + 0.2 | 0.6 + 0.2 | 0.6 + 0.2 | 0.4 | 0.5 |
| Product |  |  |  |  |  |  |
| Properties |  |  |  |  |  |  |
| Acid value | 166.3 | 167.3 | 166.5 | 169.7 | 167.3 | 166.5 |
| Softening point (°C.) | 59.0 | 57.0 | 56.5 | 56.0 | 41.0 | 51.0 |
| Color | 4 | 3 | 4 | 4 | 9 | 7 |
| Composition |  |  |  |  |  |  |
| Resin acids (%) | 85.1 | 84.5 | 84.3 | 84.2 | 80.6 | 82.0 |
| DAA[2] (%) | 47.4 | 44.2 | 44.6 | 44.1 | 27.2 | 7.3 |
| AA[3] (%) | 0 | 0 | 0 | 0 | 0.7 | 21.9 |
| Fatty acids (%) | 4.2 | 5.3 | 5.1 | 6.8 | 8.9 | 7.3 |

[1] Iron powder
[2] DAA : dehydroabietic acid
[3] AA : abietic acid

Table 1 shows that the process of the invention effectively disproportionates rosin with abietic acid completely eliminated from the product, whereas the conventional process using iodine fails to completely eliminate abietic acid. The use of sodium iodide alone permits a large amount of abietic acid to remain in the product, failing to effect sufficient disproportionation. The present process provides disproportionated products with a lesser reduction in the softening point of the starting material and with minimized coloration, but the use of iodine or potassium iodide entails a greater reduction in the softening point and marked coloration.

EXAMPLES 5 TO 8

Into a four-necked flask are placed 200 g of tall oil and a specified amount of catalyst, and the mixture is heated with stirring at 250° C. for 3 hours while nitrogen gas is being introduced into the flask. On completion of the reaction, the reaction mixture is separated Table 2 shows the kind and amount of the catalyst used, and the results obtained by the analysis of the product.

TABLE 2

|  | Ex. 5 | Ex. 6 | Ex. 7 | Ex. 8 | Comp. Ex. 3 |
|---|---|---|---|---|---|
| Catalyst |  |  |  |  |  |
| Kind | KI + Fe[1] | KI + Fe$_2$O$_3$ | KI + Fe(OH)$_3$ | KI + FeS | KI |
| Amount (wt. %) | 1.0 + 0.5 | 1.0 + 0.5 | 1.0 + 0.5 | 1.0 + 0.5 | 1.0 |
| Product |  |  |  |  |  |
| Acid value | 165.5 | 167.1 | 166.3 | 165.6 | 164.8 |
| Resin acids (%) | 49.5 | 49.7 | 48.9 | 48.6 | 46.9 |
| AA[2] (%) | 0 | 0 | 0 | 0 | 10.9 |
| DAA[3] (%) | 31.0 | 30.2 | 28.5 | 32.0 | 24.9 |
| Fatty acids (%) | 37.1 | 37.7 | 38.1 | 38.0 | 39.2 |
| Linoleic acid (%) | 0.5 | 0.4 | 0.4 | 0.5 | 4.1 |
| Oleic acid (%) | 33.2 | 34.1 | 33.7 | 34.3 | 21.2 |

[1] Iron powder
[2] AA : abietic acid
[3] DAA : dehydroabietic acid

Table 2 reveals that the present process, when practiced for tall oil, completely eliminates abietic acid from the resin acids contained in the tall oil, primarily forming dehydroabietic acid, and also chiefly forms oleic acid which is a mono-unsaturated fatty acid. In contrast, the use of potassium iodide alone as a catalyst affords a product still containing abietic acid and a lower content of mono-unsaturated fatty acid.

EXAMPLES 9 TO 12

Into a four-necked flask are placed 200 g of tall oil fatty acids and a specified quantity of catalyst, and the mixture is heated with stirring at 220° C. for 3 hours while nitrogen gas is being introduced into the flask.

The reaction mixture is cooled and then distilled to collect a fraction at 190° to 200° C./2.5 mm Hg. Table 3 shows the result obtained by the analysis of the fraction, the yield thereof relative to the fatty acid starting material, and the kinds and amounts of catalysts used. The tall oil fatty acid used as the starting material has the following properties.

Iodine value: 157
Acid value: 195.9
Resin acids: 1.9%
Fatty acids: 96.9%
Oleic acid: 31.1%
Linoleic acid: 41.5%
Linolenic acid: 2.9%
$C_{18}$ Conjugated diene acid: 2.2%

COMPARISON EXAMPLE 4

Diproportionation reaction is performed, followed by distillation, in the same manner as in Examples 9 to 12 except that sodium iodide is used as a catalyst.

Table 3 shows the result obtained by the analysis of the fraction, yield relative to the tall oil fatty acid used as the starting material, and the kind and amount of catalyst used.

TABLE 3

|  | Ex. 9 | Ex. 10 | Ex. 11 | Ex. 12 | Comp. Ex. 4 |
|---|---|---|---|---|---|
| Catalyst |  |  |  |  |  |
| Kind | NaI + Fe[1] | NaI + Fe$_2$O$_3$ | NaI + Fe(OH)$_3$ | NaI + FeS | NaI |
| Amount (wt. %) | 0.5 + 0.3 | 0.5 + 0.3 | 0.5 + 0.3 | 0.5 + 0.3 | 0.5 |
| Product |  |  |  |  |  |
| Yield (%) | 78.5 | 79.2 | 78.3 | 78.5 | 77.5 |
| Iodine value | 87 | 85 | 86 | 84 | 121 |
| Acid value | 192.5 | 191.9 | 192.4 | 193.1 | 191.2 |
| Resin acids (%) | 0 | 0 | 0 | 0 | 0 |
| Fatty acids |  |  |  |  |  |
| Oleic acid (%) | 75.1 | 74.3 | 73.6 | 73.9 | 45.4 |
| Linoleic acid (%) | 0.1 | 0.2 | 0.1 | 0.2 | 0.1 |
| Linolenic acid (%) | 2.2 | 1.9 | 2.2 | 2.1 | 9.5 |
| C$_{18}$ Conjugated diene acid (%) | 3.4 | 3.3 | 3.4 | 3.3 | 22.3 |

[1] Iron powder

Table 3 reveals that the process of the invention, when applied to fatty acids, gives mono-unsaturated fatty acids of high purity almost free from poly-unsaturated fatty acids, whereas the use of sodium iodide alone as a catalyst affords only a mixture of unsaturated fatty acids containing a large amount of $C_{18}$ conjugated diene acid, thus failing to effect sufficient disproportionation.

EXAMPLES 13 to 18

Each of the disproportionated products prepared in the Examples listed in Table 4 is neutralized with potassium hydroxide to obtain a soap, which is then tested for properties as an emulsifier for emulsion polymerization.

For this testing, the following composition is placed into a pressure resistant reactor and cooled to 5° C. With 0.05 part by weight of p-menthanehydroperoxide placed into the reactor, the composition is subjected to polymerization at 5° C. for 8 hours with stirring. Subsequently 0.05 part by weight of sodium dimethyldithiocarbamate is placed into the reactor to terminate the reaction.

Styrene: 15 parts by weight
Butadiene: 35 parts by weight
Sodium formaldehyde-sulfoxylate.2H$_2$O: 0.075 parts by weight
Ferrous sulfate.7H$_2$O: 0.025 part by weight
EDTA tetrasodium salt: 0.035 part by weight
Sodium phosphate.12H$_2$O: 0.400 part by weight
Sodium naphthalenesulfonate-formaldehyde condensate: 0.075 part by weight
Dodecylmercaptan: 0.100 part by weight
Emulsifier: 2 part by weight
Deionized water: 100 part by weight The styrene-butadiene latex obtained is steam distilled to remove the unreacted monomers. The conversion of the monomers to polymers is calculated by the following equation.

$$\text{Conversion (\%)} = \frac{\text{Weight of polymer formed}}{\text{Weight of monomers used (50)}} \times 100$$

The results are given in Table 4.

COMPARISON EXAMPLE 5

A commercial emulsifier of the disproportionated rosin type (trade mark "Rondis," prepared from gum rosin by Arakawa Kagaku Kogyo Kabushiki Kaisha, Japan) is tested in the same manner as in Examples 13 to 19, and the conversion achieved is similarly calculated. Table 4 shows the results.

TABLE 4

| Example | Disproportionated product used for emulsifier | Conversion |
|---|---|---|
| Ex. 13 | Product of Example 1 | 63.5 |
| Ex. 14 | Product of Example 2 | 62.8 |
| Ex. 15 | Product of Example 3 | 62.5 |
| Ex. 16 | Product of Example 4 | 61.9 |
| Ex. 17 | Product of Example 5 | 62.5 |
| Ex. 18 | Product of Example 9 | 74.6 |
| Comp. Ex. 5 | Commercial emulsifier | 62.3 |

Table 4 reveals that the emulsifiers prepared from disproportionated products of the invention assure emulsion polymerization as effectively as the conventional emulsifier.

We claim:

1. A process for disproportionating resin, polyunsaturated fatty acid or mixture thereof, which comprises conducting a disproportionation reaction in the presence of a catalyst comprising (A) at least one iodide selected from the group consisting of sodium iodide and potassium iodide and (B) at least one iron compound selected from the group consisting of iron, iron oxides, iron hydroxides and iron sulfides.

2. A process as defined in claim 1 wherein the iodide (A) is used in an amount of about 0.01 to about 5% by weight based on the rosin, poly-unsaturated fatty acid or mixture thereof.

3. A process as defined in claim 2 wherein the iodide (A) is used in an amount of about 0.1 to about 2% by weight based on the rosin, poly-unsaturated fatty acid or mixture thereof.

4. A process as defined in claim 1 wherein the iron compound (B) is used in an amount of about 0.01 to about 5% by weight based on the rosin, poly-unsaturated fatty acid or mixture thereof.

5. A process as defined in claim 4 wherein the iron compound (B) is used in an amount of about 0.1 to about 1% by weight based on the rosin, poly-unsaturated fatty acid or mixture thereof.

* * * * *